United States Patent
Koizumi

(10) Patent No.: US 12,322,965 B2
(45) Date of Patent: Jun. 3, 2025

(54) DISTRIBUTION GRID FAILURE SYMPTOM CAUSE ESTIMATION SYSTEM

(71) Applicant: Mitsubishi Electric Corporation, Tokyo (JP)

(72) Inventor: Kaho Koizumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 238 days.

(21) Appl. No.: 17/692,591

(22) Filed: Mar. 11, 2022

(65) Prior Publication Data

US 2023/0131038 A1 Apr. 27, 2023

(30) Foreign Application Priority Data

Oct. 25, 2021 (JP) .................................. 2021-173730

(51) Int. Cl.
*H02J 13/00* (2006.01)
*G06N 5/04* (2023.01)
*G06N 20/00* (2019.01)

(52) U.S. Cl.
CPC .......... *H02J 13/00028* (2020.01); *G06N 5/04* (2013.01); *G06N 20/00* (2019.01)

(58) Field of Classification Search
CPC ...... H02J 13/00028; G06N 5/04; G06B 13/04
See application file for complete search history.

(56) References Cited

U.S. PATENT DOCUMENTS

2009/0187284 A1* 7/2009 Kreiss ................... G06Q 50/06
700/297
2009/0267611 A1* 10/2009 Wahlroos ............. G01R 31/088
324/522

(Continued)

FOREIGN PATENT DOCUMENTS

JP 2017-005891 A 1/2017
JP 2020174493 A 10/2020

(Continued)

OTHER PUBLICATIONS

Notice of Reasons for Refusal dated Sep. 3, 2024, issued in the corresponding Japanese Patent Application No. 2021-173730, 5 pages including 3 pages of English Translation.

*Primary Examiner* — Nicholas Klicos
(74) *Attorney, Agent, or Firm* — BUCHANAN, INGERSOLL & ROONEY PC

(57) ABSTRACT

Protection distribution devices including switches, disposed on a distribution grid, are individually provided with slave stations. The slave stations are connected to each other via communication lines and connected to a high-order server. Each slave station includes a failure symptom cause estimation circuitry to estimate a symptom cause for failure on the distribution grid on the basis of waveform data measured by a measurement circuitry which performs signal processing on waveform data of current or voltage detected by the protection distribution device, and a data transmitter/receiver to transmit an estimation result for the symptom cause for failure on the distribution grid obtained by the failure symptom cause estimation circuitry, to the server. The failure symptom cause is autonomously estimated through mutual communication among the slave stations.

5 Claims, 17 Drawing Sheets

(56) References Cited

U.S. PATENT DOCUMENTS

| | | | | |
|---|---|---|---|---|
| 2010/0152910 A1* | 6/2010 | Taft | | H02H 3/042 |
| | | | | 700/286 |
| 2011/0282508 A1* | 11/2011 | Goutard | | H02J 3/06 |
| | | | | 700/286 |
| 2013/0063272 A1* | 3/2013 | Bhageria | | H02J 13/00002 |
| | | | | 340/650 |
| 2013/0063273 A1* | 3/2013 | Bhageria | | H02J 13/00034 |
| | | | | 340/653 |
| 2013/0232094 A1* | 9/2013 | Anderson | | G05B 23/0281 |
| | | | | 706/12 |
| 2014/0249688 A1* | 9/2014 | Ansari | | H02J 3/381 |
| | | | | 700/297 |
| 2014/0277788 A1* | 9/2014 | Forbes, Jr. | | H02J 3/14 |
| | | | | 700/286 |
| 2014/0351010 A1* | 11/2014 | Kong | | G06Q 30/0201 |
| | | | | 705/7.29 |
| 2016/0054372 A1* | 2/2016 | Melo | | G01R 31/003 |
| | | | | 702/57 |
| 2016/0072270 A1* | 3/2016 | Rostron | | H02H 3/081 |
| | | | | 700/294 |
| 2017/0003335 A1* | 1/2017 | Kang | | G01R 31/085 |
| 2018/0128862 A1 | 5/2018 | Satoh et al. | | |
| 2019/0277894 A1 | 9/2019 | Suzuki et al. | | |
| 2019/0296547 A1* | 9/2019 | Kelly | | H02J 3/004 |
| 2020/0210854 A1* | 7/2020 | Srinivasan | | G06N 5/02 |
| 2020/0292608 A1* | 9/2020 | Yan | | G06N 3/044 |
| 2020/0293032 A1* | 9/2020 | Wang | | G01R 19/2513 |
| 2020/0310400 A1* | 10/2020 | Jha | | G05B 23/0254 |

FOREIGN PATENT DOCUMENTS

| | | |
|---|---|---|
| JP | 2021-027676 A | 2/2021 |
| JP | 2021-065035 A | 4/2021 |
| JP | 2021-151089 A | 9/2021 |
| WO | 2018/047966 A1 | 3/2018 |

\* cited by examiner

DISTRIBUTION GRID FAILURE SYMPTOM CAUSE ESTIMATION SYSTEM

BACKGROUND OF THE INVENTION

1. Field of the Invention

The present disclosure relates to a distribution grid failure symptom cause estimation system.

2. Description of the Background Art

In recent years, natural disasters such as a typhoon, an earthquake, and snow damage have frequently occurred both domestically and abroad. In distribution grids, a lot of failures have occurred due to such environmental factors, and it is necessary to improve efficiency of work for eliminating a cause of failure occurrence on site.

Conventionally, in a case where failure such as ground fault or short-circuit has occurred, the failure site is visually confirmed to specify a failure cause, and a worker performs work for eliminating the failure cause. However, if a large-scale natural disaster has occurred, this needs to be coped with at a plurality of sites, and therefore it is difficult to perform quick restoration in the present circumstances. Considering this, a system for recognizing in advance a symptom leading to occurrence of failure, such as supply fault of a distribution line, is established. Thus, before failure occurs, equipment can be renovated in advance, and equipment investment required for efficient measures, or repair, inspection, or restoration work is performed, to optimize labor cost.

As a system for detecting, at a slave station, a symptom leading to failure occurrence on a distribution grid, conventionally, establishment of a system in which a distribution grid monitoring device is provided to collect information among slave stations through communication or a self-judgement criterion is generated through neurocomputing, for example, is being attempted (see, for example, Patent Document 1).

Patent Document 1: Japanese Laid-Open Patent Publication No. 2020-174493

In the conventional failure symptom cause estimation system, a communication device and a detector for detecting current, voltage, etc. applied to a distribution line are mounted to each of automatic switches provided to a distribution grid. Meanwhile, each automatic switch is individually provided with a slave station for forming a communication network, a measured data processing function is imparted to each slave station, and waveform data of current, voltage, etc. detected by the detector provided to the automatic switch is transmitted to the slave station via a communication device. Each slave station performs signal processing on the acquired waveform data using the measured data processing function, and transmits the processing result to a high-order server provided at a representative site.

In this case, generally, each slave station collects waveform data needed for estimating a symptom leading to failure occurrence, at a timing such as a constant-cycle collection time, a failure symptom detection time, or a circuit breaker interruption time when a failure is detected, for example. Then, at a timing such as a time of collecting waveform data as a symptom for failure occurrence, a constant-cycle collection time thereof, or a restoration time after interruption of a feeder circuit breaker (FCB), each slave station cooperates with the high-order server, to estimate a symptom leading to failure occurrence on the basis of waveform data stored in the server in advance.

In conventional technology, waveform data to be transmitted from each slave station to the high-order server is often measured at a sampling cycle of more than several thousand samples per second, and therefore adjustment such as restricting the data size, transfer speed, or the like is generally made in consideration of the load on the network in data transmission. However, the number of slave stations individually provided to the automatic switches on the distribution grid can exceed several tens of thousands. Therefore, under the circumstance in which failures of distribution lines frequently occur due to large-scale natural disasters such as a typhoon and an earthquake, the load on the network might be increased to no small extent.

Regarding transfer of waveform data between the high-order server and each slave station, it is possible to relax the load on the network to a certain extent by configuring the network optically. However, under the circumstance as described above, a large amount of waveform data is transferred through the network, so that the network load is increased and this might cause a problem such as delay or transfer abnormality. Therefore, in operation work for a distribution grid using the same network, such troubles that the state of the slave station cannot be monitored or control for the slave station fails, can occur.

For the above reason, in order to achieve, between the high-order server and the slave stations, a sufficient network bandwidth or speed under the assumption that failures of distribution lines frequently occur, expensive equipment investment and high-level network technology for system establishment are needed. In addition, the high-order server needs to estimate a symptom leading to failure occurrence on the basis of enormous waveform data collected from the slave stations, and thus a server resource for processing such enormous waveform data and complicated server application technology therefor are needed.

In addition, each slave station acquires, as a symptom, also slight waveform data at such a level that power outage does not occur on the distribution grid. Therefore, all the waveform data transmitted to the server are not always waveform data due to failures that actually occur on distribution lines.

In addition, a symptom leading to failure occurrence not only occurs at the corresponding slave station but also is detected by the surrounding slave stations simultaneously. Therefore, it is impossible to perform cause estimation about the location and the type of the failure until the high-order server analyzes the waveform data.

That is, it is difficult to accurately determine a symptom leading to failure occurrence from only the waveform data detected by one slave station alone. Therefore, by referring to information of a plurality of slave stations together, a failure symptom occurrence location is roughly specified, and considering also past failure cases at that location, a failure cause is estimated. Finally, the corresponding slave station and the adjacent sites (distribution lines, adjacent slave stations, etc.) are visually confirmed at the site. Thus, the actual situation is found only after such a process. As described above, conventionally, a plurality of systems are used and human work is needed, which requires time and labor, and therefore there is room for improvement.

SUMMARY OF THE INVENTION

The present disclosure has been made to solve the above problem, and an object of the present disclosure is to provide a distribution grid failure symptom cause estimation system that enables a symptom leading to failure occurrence to be accurately determined by a slave station autonomously without transmitting waveform data to a high-order server, and allows slave stations to perform information cooperation mutually so as to combine waveform data of a plurality of slave stations, thus enabling estimation for a cause of a symptom leading to failure occurrence.

A distribution grid failure symptom cause estimation system according to the present disclosure is a distribution grid failure symptom cause estimation system in which protection distribution devices including switches, disposed on a distribution grid, have detectors for detecting currents or voltages applied to distribution lines and are individually provided with slave stations forming a communication network. The slave stations are connected to each other via communication lines and connected to a high-order server. The slave stations each include: an operation circuitry to operate the protection distribution device in accordance with a detection result from the detector; a measurement circuitry to perform signal processing on waveform data of the current or the voltage detected by the detector; a failure symptom cause estimation circuitry to estimate a symptom cause for failure on the distribution grid on the basis of the waveform data measured by the measurement circuitry; and a data transmitter/receiver to transmit an estimation result of the symptom cause for failure on the distribution grid obtained by the failure symptom cause estimation circuitry, to the server. The slave stations each autonomously estimate the failure symptom cause through mutual communication.

In the distribution grid failure symptom cause estimation system according to the present disclosure, when estimating a failure symptom cause, only relevant slave stations communicate with each other without transmitting waveform data to the high-order server at each time. Thus, it is possible to estimate a failure symptom cause on a distribution line without increasing a network load.

DETAILED DESCRIPTION OF THE PREFERRED EMBODIMENTS OF THE INVENTION

First Embodiment

Figure 1:
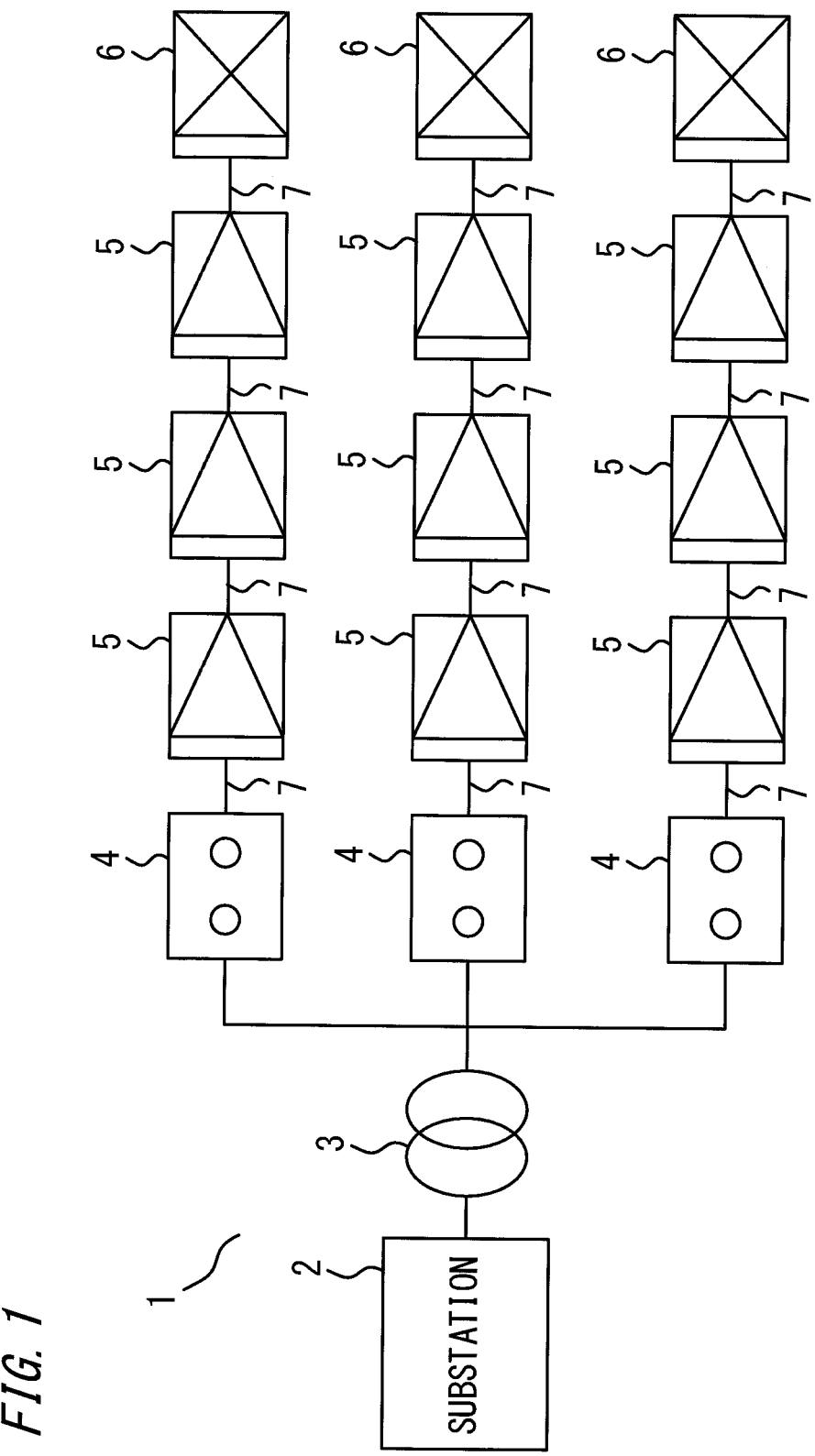
FIG. 1 is a configuration diagram showing an example of a distribution grid to which a distribution grid failure symptom cause estimation system according to the first embodiment is applied.

FIG. 1 is a configuration diagram showing an example of a distribution grid to which a distribution grid failure symptom cause estimation system according to the first embodiment is applied.

The distribution grid failure symptom cause estimation system according to the first embodiment is a system for estimating a cause of a symptom leading to failure occurrence in the distribution grid.

The distribution grid 1 includes, for example, as shown in FIG. 1, a substation 2 which is a distribution source, a transformer 3 at a branch point, and protection distribution devices (in FIG. 1, circuit breakers 4, switches (normally closed) 5, switches (normally opened) 6 correspond to the protection distribution devices), and these are connected via distribution lines 7.

In particular, here, the switches (normally closed) 5 and the switches (normally opened) 6 forming the protection distribution devices are provided with detectors (not shown) for detecting currents, voltages, etc., applied to the distribution lines 7.

Figure 2:
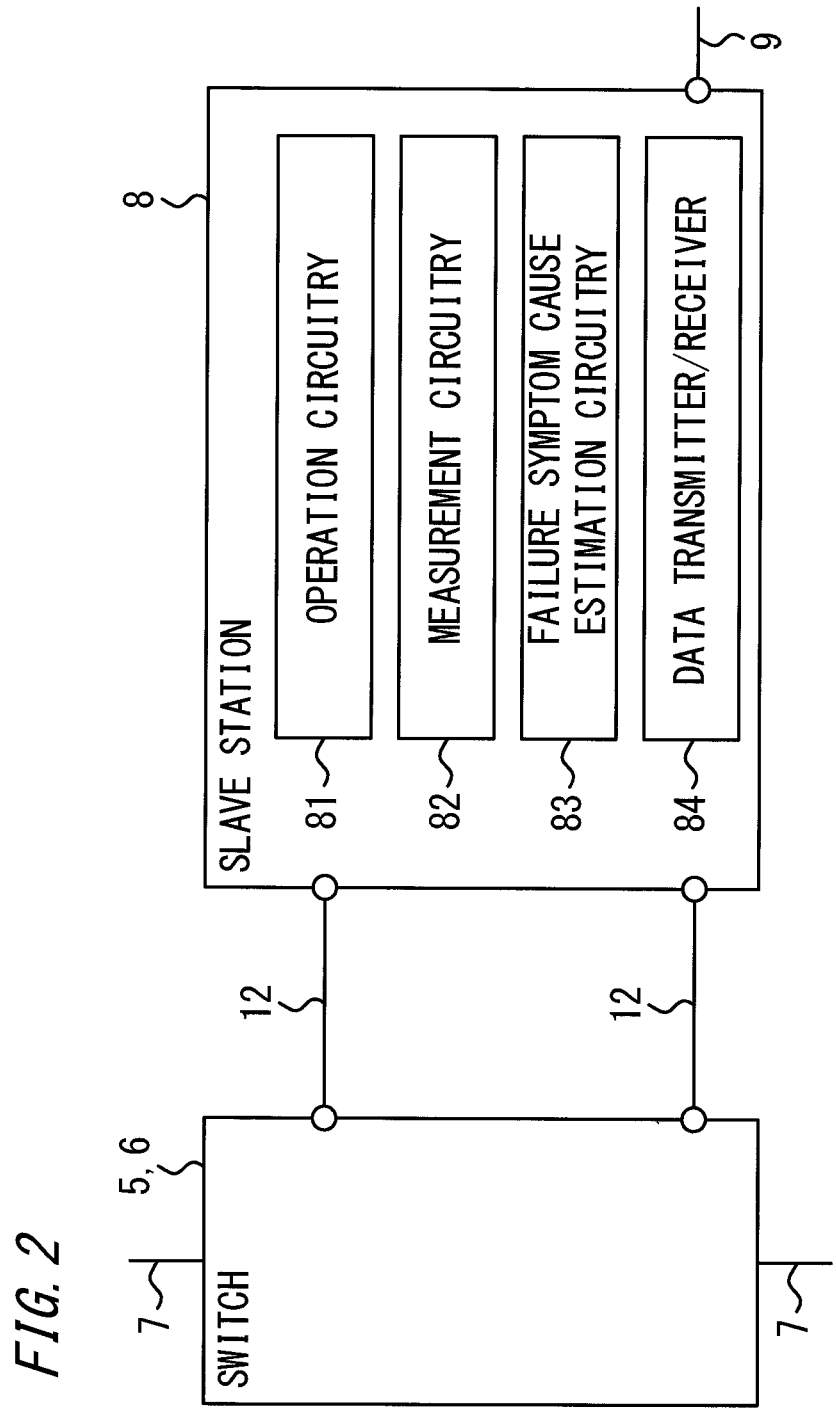
FIG. 2 is a block diagram showing the configuration of a switch and a slave station individually provided to the switch in the distribution grid shown in FIG. 1.
Figure 3:
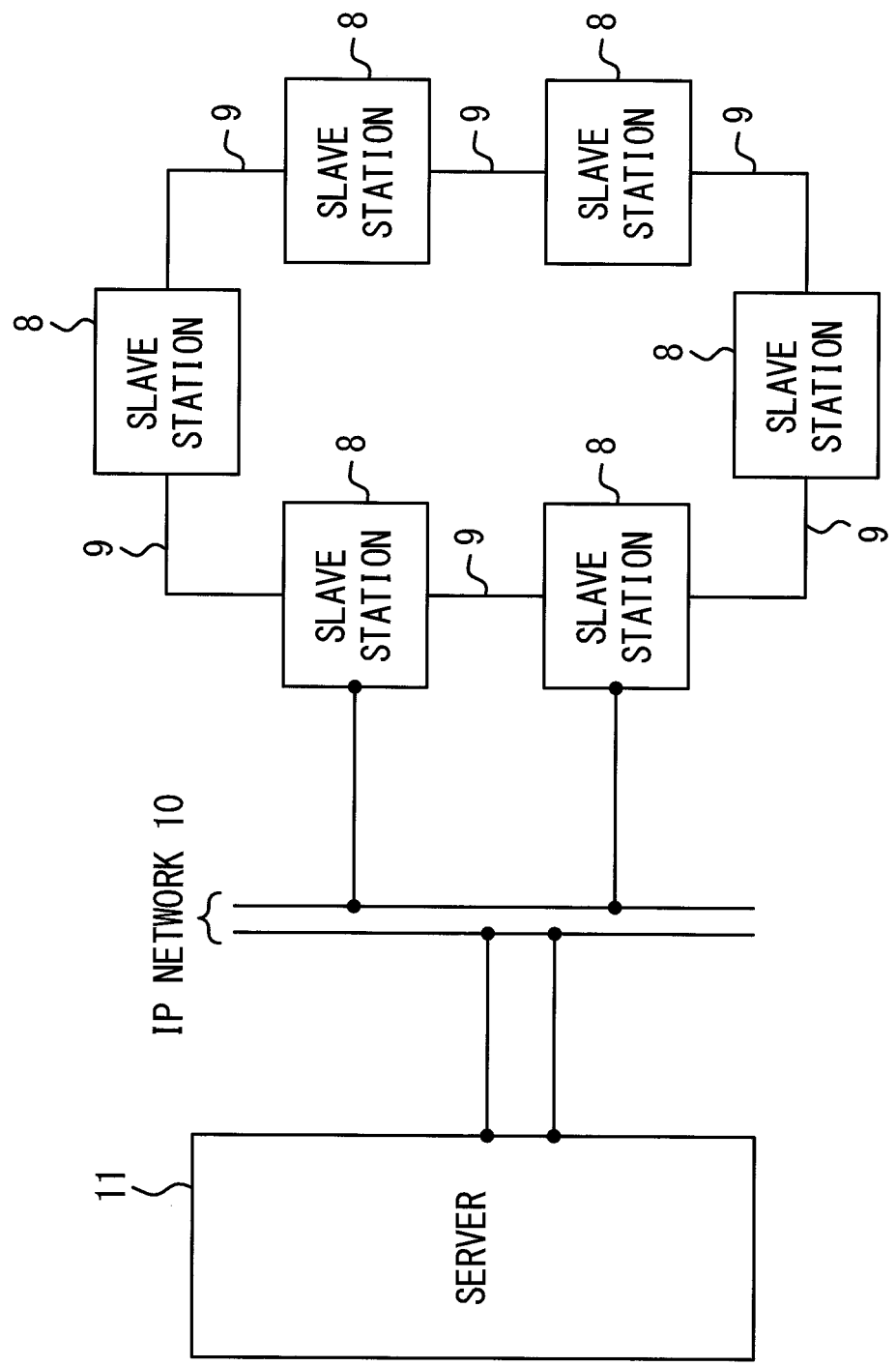
FIG. 3 is a configuration diagram showing an example of a communication network formed by slave stations and a high-order server.

As shown in FIG. 2, a slave station 8 for forming a communication network is individually provided to each switch 5, 6. As shown in FIG. 3, for example, the slave stations 8 are connected to each other via communication lines 9 such as optical cables, and are connected to a high-order server 11 via an IP network 10.

Each slave station 8 is electrically connected to the switch 5, 6 via signal lines 12. Each slave station 8 is provided with: an operation circuitry 81 which takes in waveform data of current, voltage, etc., detected by the detector (not shown)

provided to the switch 5, 6 via the signal lines 12 and performs opening/closing operation of the switch 5, 6; a measurement circuitry 82 which takes in the waveform data of current, voltage, etc., detected by the detector and performs signal processing thereon; a failure symptom cause estimation circuitry 83 having an artificial intelligence (hereafter abbreviated as "AI") function for estimating a symptom cause for failure on the distribution grid 1 on the basis of the waveform data obtained by the measurement circuitry 82; and a data transmitter/receiver 84 which transmits a result of estimation for a symptom cause for failure on the distribution grid 1 obtained by the failure symptom cause estimation circuitry 83 to the high-order server 11, and acquires information from the server 11. The configuration and the details of the failure symptom cause estimation circuitry 83 will be described later.

Next, a feature of failure symptom detection in the distribution grid failure symptom cause estimation system according to the first embodiment will be described.

Figure 4:
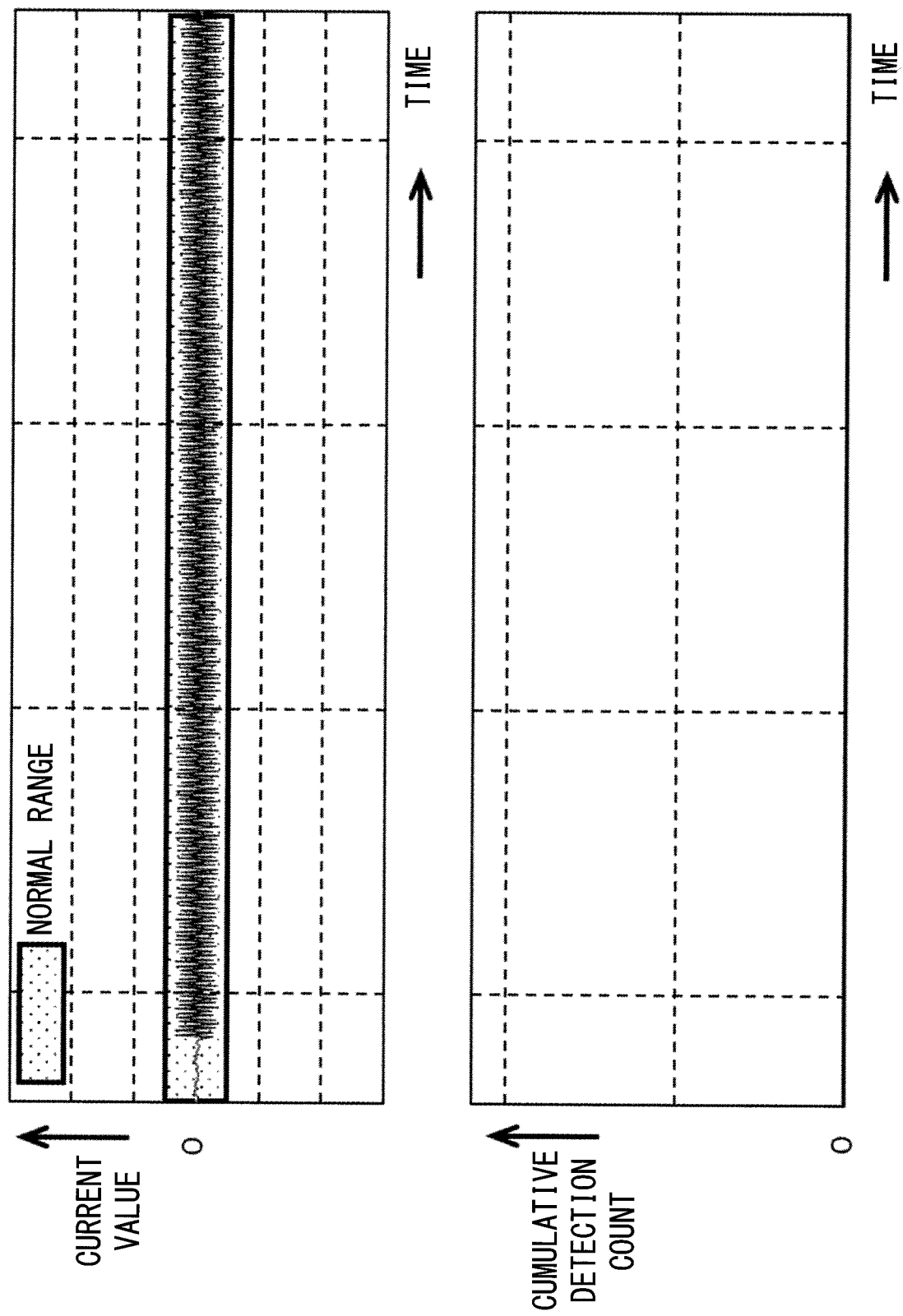
FIG. 4 shows characteristics graphs of waveform data of current, voltage, etc., and the change tendency of a cumulative detection count, measured by a measurement circuitry of the slave station, in a case where the distribution grid is normal.
Figure 5:
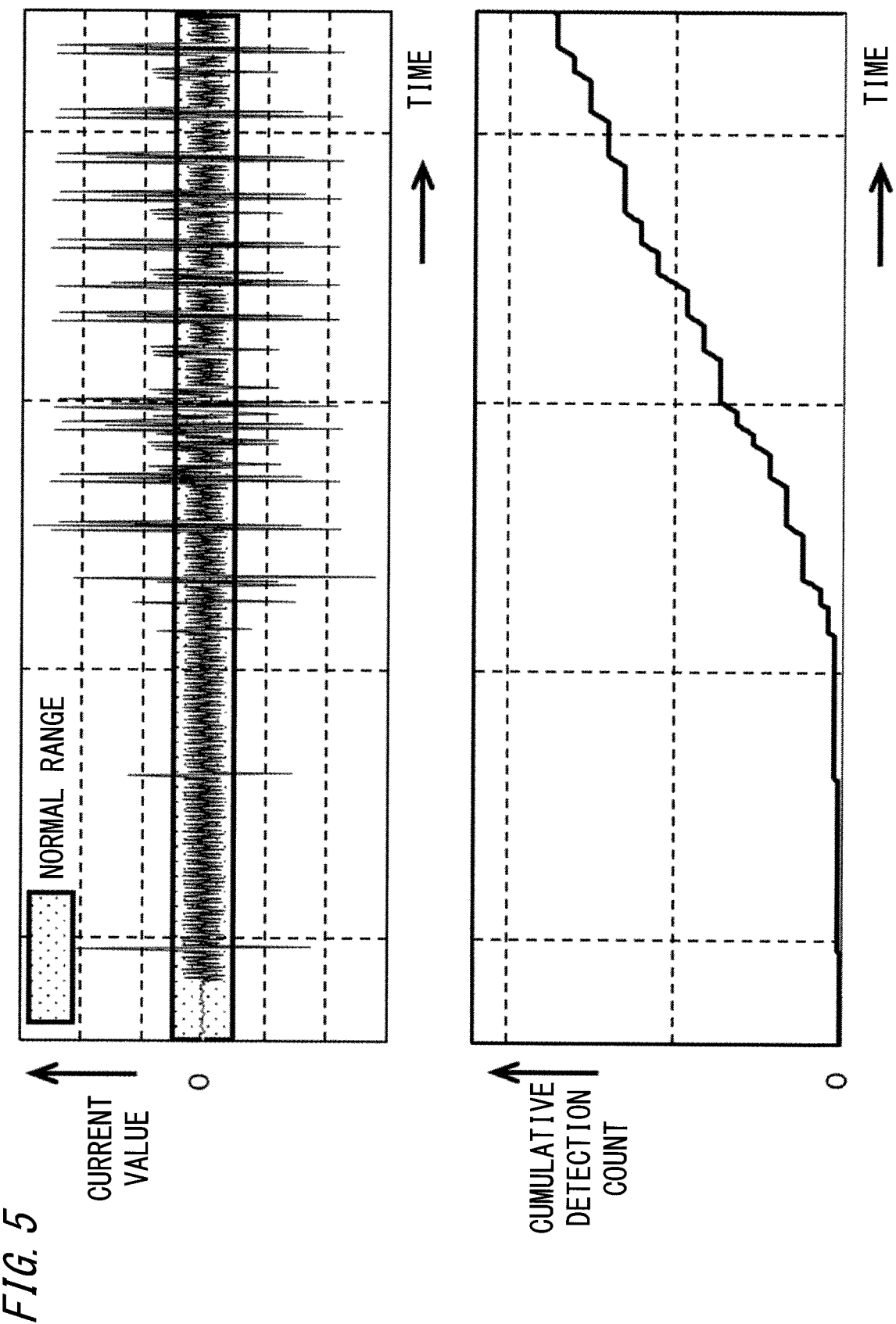
FIG. 5 shows characteristics graphs of waveform data of current, voltage, etc., and the change tendency of the cumulative detection count, measured by the measurement circuitry of the slave station, in a case where there is a failure symptom in the distribution grid.
Figure 6:
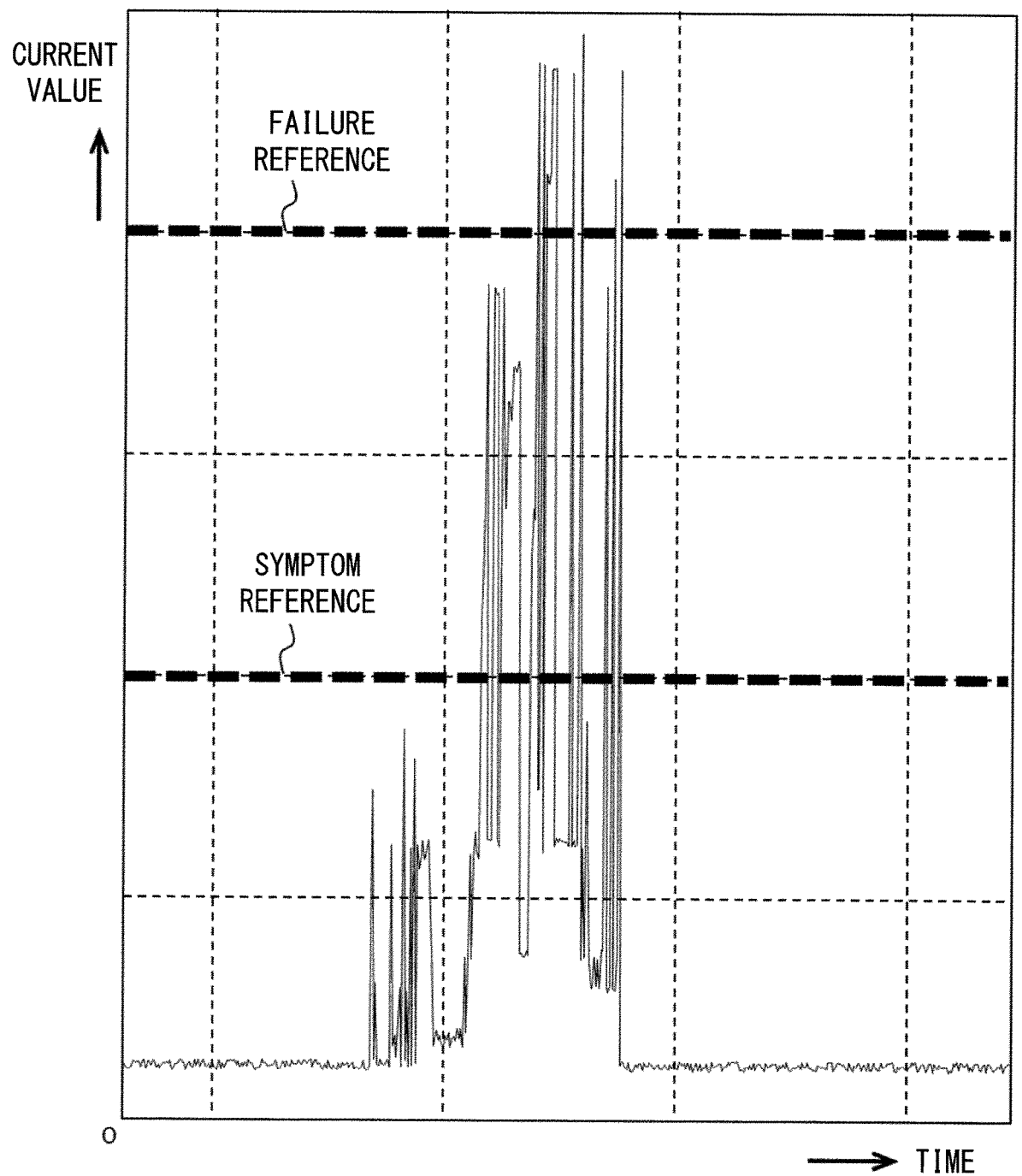
FIG. 6 shows characteristics graphs of waveform data of current, voltage, etc., and the change tendency of the cumulative detection count, measured by the measurement circuitry of the slave station, in a case where there is abnormality in the distribution grid.

First, in each of a case where the distribution grid 1 is normal, a case where there is a symptom leading to failure occurrence at a part of the distribution lines 7, and a case where abnormality such as short-circuit failure occurs at a part of the distribution lines 7, waveform data of current, voltage, etc., and change in a cumulative value of the number of detections indicating a symptom or abnormality (hereafter referred to as cumulative detection count), measured by the measurement circuitry 82 of each slave station 8 will be described with reference to FIG. 4, FIG. 5, and FIG. 6.

FIG. 4 shows the case where the distribution grid 1 is normal, and the current waveform (upper stage in FIG. 4) measured in the slave station 8 is kept within a certain threshold range set in advance. In addition, the cumulative detection count (lower stage in FIG. 4) does not increase as time elapses. In FIG. 4, the number of detections indicating abnormality is zero.

FIG. 5 shows the case where there is a symptom leading to failure occurrence at a part of the distribution lines 7, and the current waveform (upper stage in FIG. 5) measured in the slave station 8 frequently becomes out of the certain threshold range set in advance. In addition, the cumulative detection count (lower stage in FIG. 5) gradually increases as time elapses.

FIG. 6 shows the case where abnormality such as short-circuit failure occurs at a part of the distribution lines 7, and the current waveform measured in the slave station 8 partly exceeds a certain threshold range for failure determination set in advance. In FIG. 6, a symptom reference and a failure reference are shown, and the failure reference is exceeded at the time of abnormality.

Figure 7:
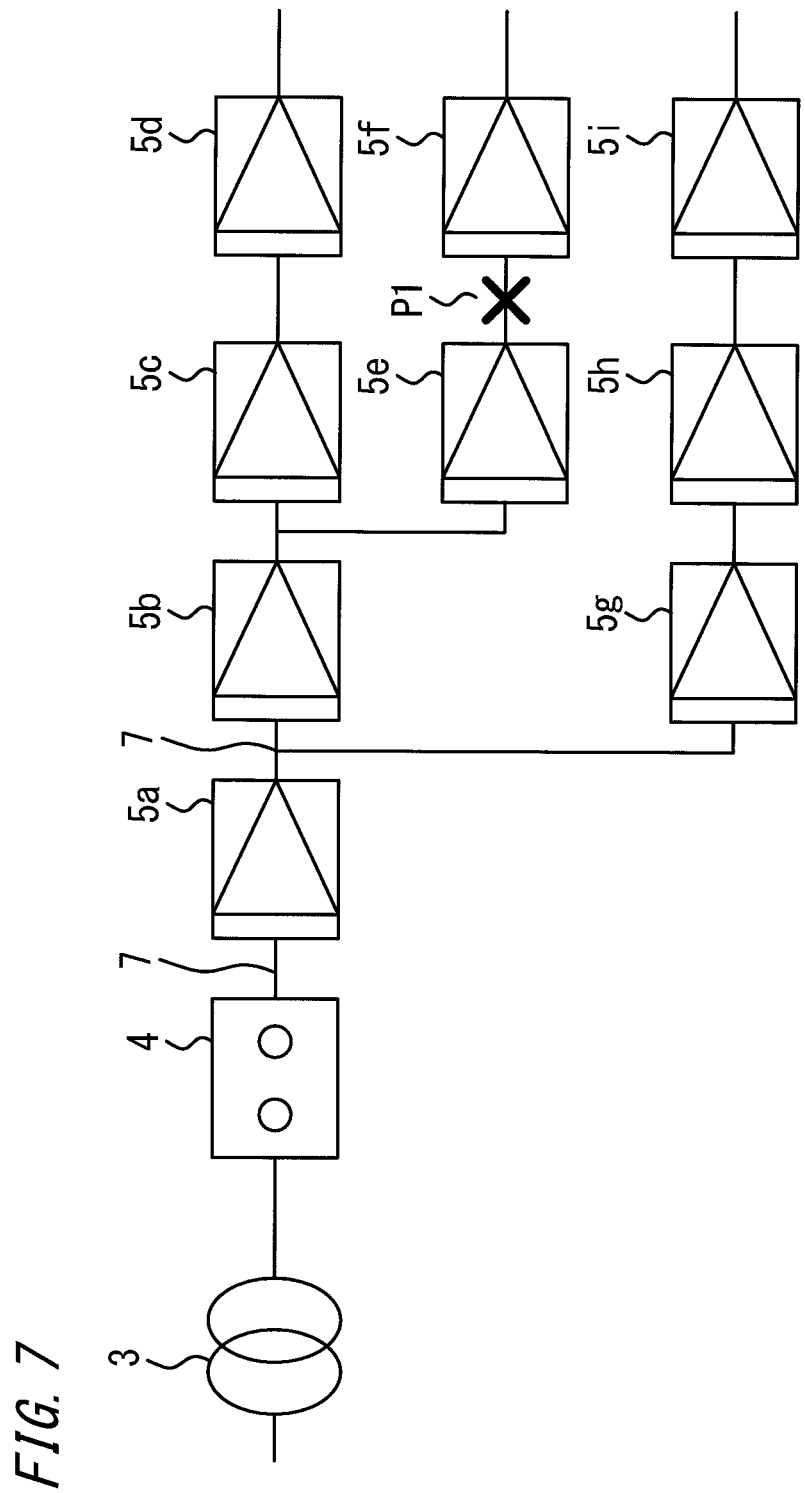
FIG. 7 is a grid diagram showing an example in which failure occurs at a part of a distribution grid.

FIG. 7 is a grid diagram showing an example in which failure has occurred at a part of a distribution grid.

Figure 8:
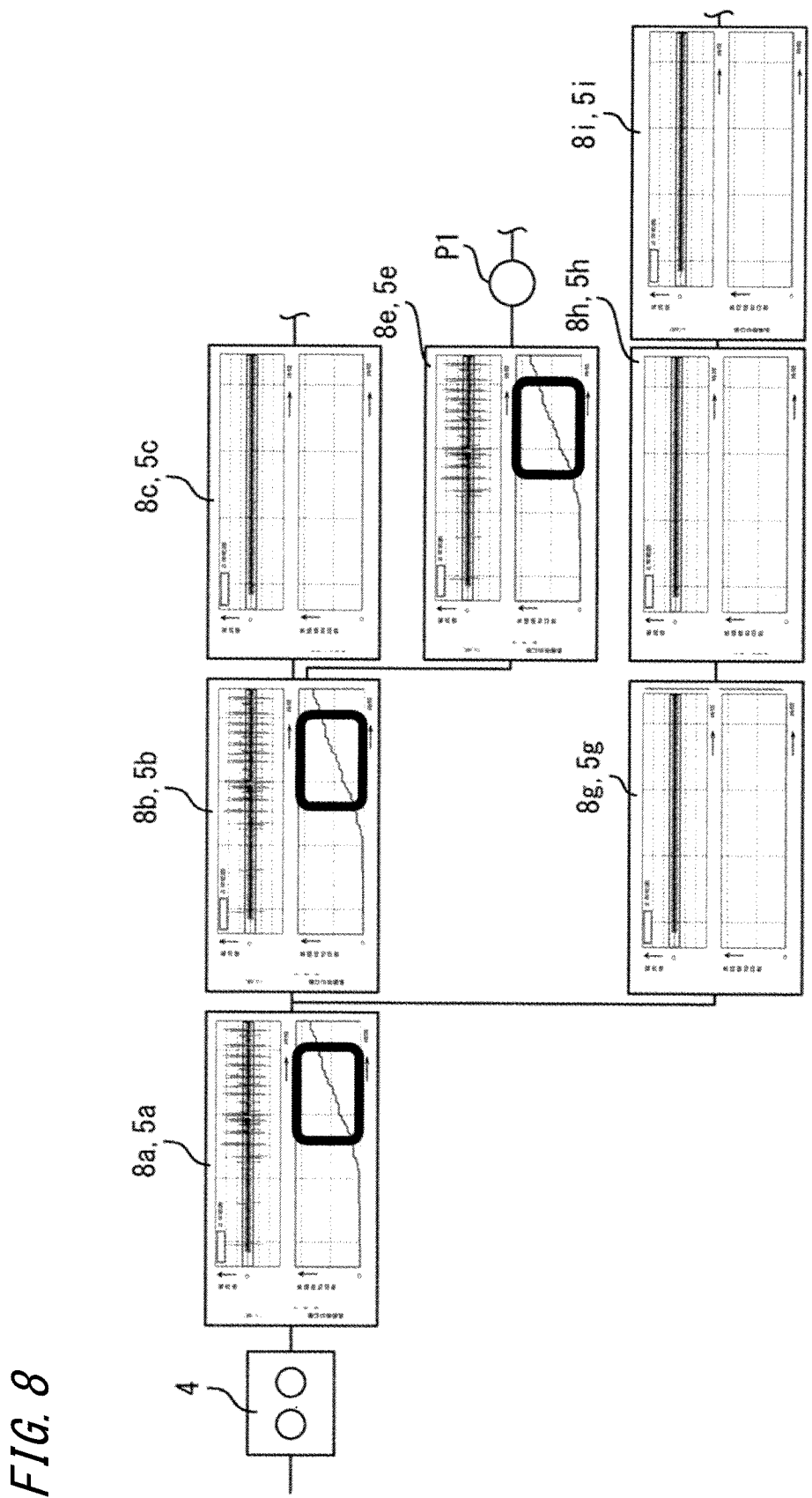
FIG. 8 illustrates waveform data of current, voltage, etc., and change in the cumulative detection count, measured by the measurement circuitry of each slave station, in the case of FIG. 7.

FIG. 8 illustrates a current waveform and change in the cumulative detection count, measured by the measurement circuitry 82 in each slave station 8, in a case where the distribution grid as shown in FIG. 7 is adopted and short-circuit failure has occurred at a part of the distribution lines 7 indicated by reference character P1.

As is found from FIG. 8, when short-circuit failure has occurred on the distribution line 7 connected to a low-order switch (here, switch 5*e*) away from the substation 2, variations in the current waveform and the cumulative detection count, measured in a slave station 8*e* of the switch 5*e* due to the short-circuit failure, propagate to the current waveforms and the cumulative detection counts measured fey slave stations 8*b*, 8*a* of high-order switches (here, switches 5*b*, 5*a*) closer to the substation 2. For slave stations 8*c*, 8*g*, 8*h*, 8*i* corresponding to the switches denoted by reference characters 5*c*, 5*g*, 5*h*, 5*i*, there is no influence of variations in the current waveform and the cumulative detection count due to the failure. Therefore, by investigating whether or not there is an influence of variations in the current waveform and the cumulative detection count through mutual communication among the slave stations 8, it is possible to specify a part of the distribution lines 7 where the failure has occurred.

Figure 9:
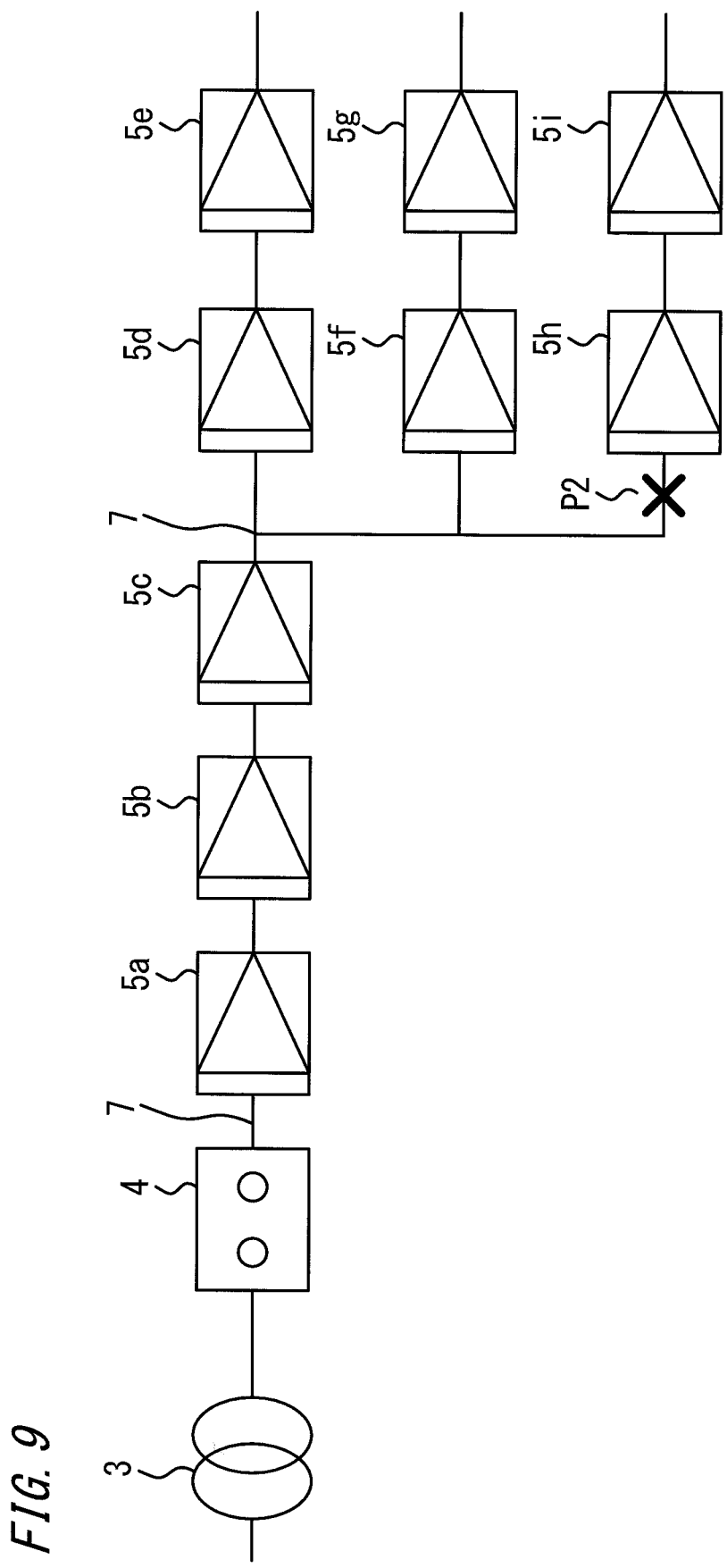
FIG. 9 is a grid diagram showing another example in which failure occurs at a part of a distribution grid.

FIG. 9 is a grid diagram showing an example in which failure has occurred at a part of a distribution grid.

Figure 10:
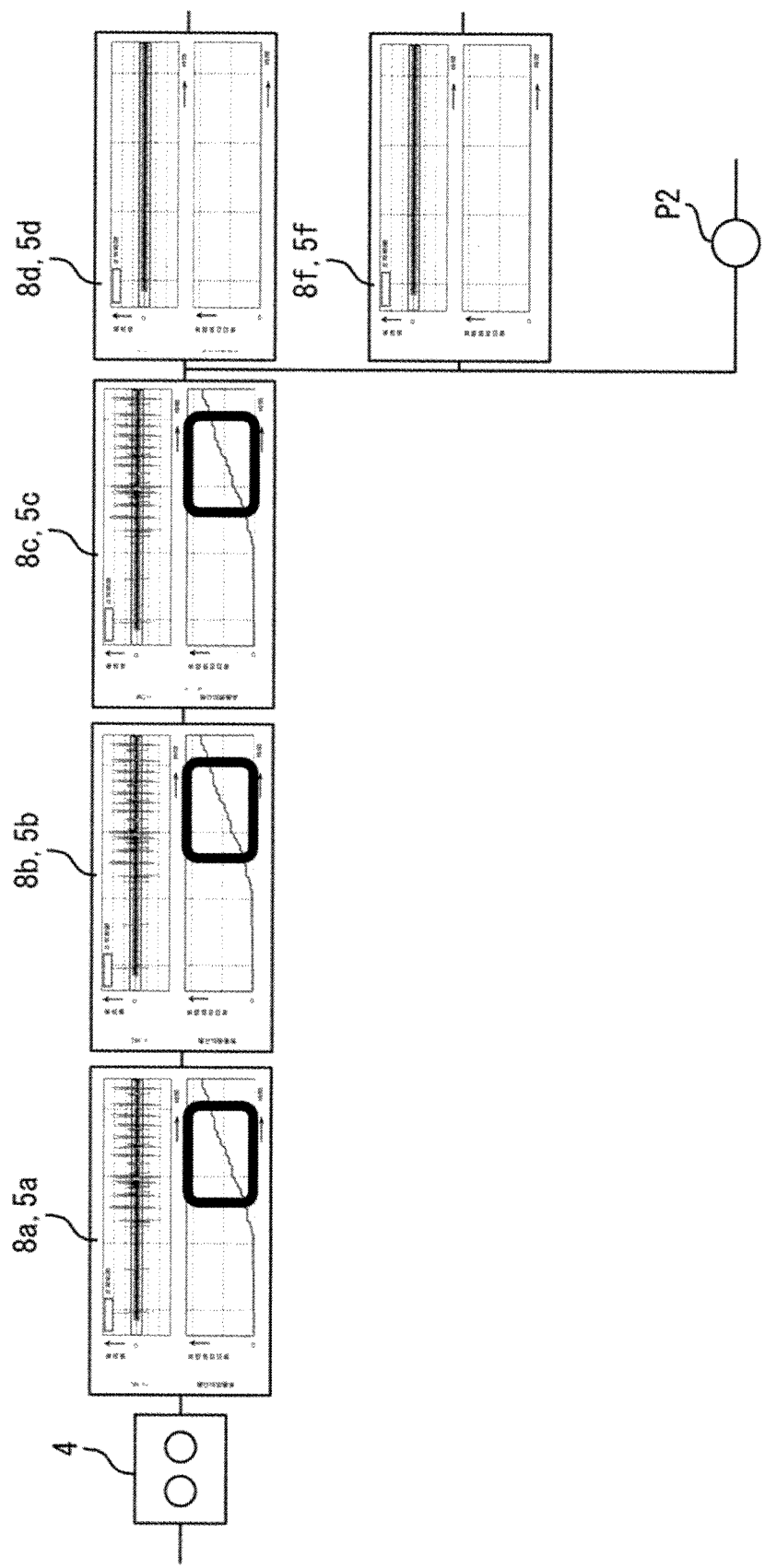
FIG. 10 illustrates waveform data of current, voltage, etc., and change in the cumulative detection count, measured by the measurement circuitry of each slave station, in the case of FIG. 9.

FIG. 10 illustrates the current waveform and change in the cumulative detection count, measured by the measurement circuitry 82 in each slave station 8, in a case where the distribution grid as shown in FIG. 9 is adopted and short-circuit failure has occurred at a part of the distribution lines 7 indicated by reference character P2.

As is found from FIG. 10, when short-circuit failure has occurred on the distribution line 7 connected to a low-order switch (here, switch 5*c*) away from the substation 2, variations in the current waveform and the cumulative detection count, measured by a slave station 8*c* of the switch 5*c* due to the short-circuit failure, propagate to the current waveforms and the cumulative detection counts measured by slave stations 8*b*, 8*a* of high-order switches (here, switches 5*b*, 5*a*) closer to the substation 2. For slave stations 8*d*, 8*f* corresponding to the switches denoted by reference characters 5*d*, 5*f*, there is no influence of variations in the current waveform and the cumulative detection count due to the failure. Therefore, also in this case, by investigating whether or not there is an influence of variations in the current waveform and the cumulative detection count through mutual communication among the slave stations 8, it is possible to specify a part of the distribution lines 7 where the failure has occurred.

Next, in a case where a symptom leading to failure occurrence has occurred or in a case where abnormality such as short-circuit failure has occurred, a feature of waveform data of current or voltage measured by the slave station 8 due to such occurrence will be described with reference to [N1] to [N7] below.

[N1] Cable ground fault (ground fault due to deterioration of a cable of a distribution line): generation and restoration of a waveform are repeated

[N2] Insulator ground fault (ground fault due to damage to an insulator): a waveform temporally changes depending on the damage state of the insulator

[N3] Animal ground fault (ground fault due to carbonization after contact of an animal with a distribution line cable): state close to complete ground fault

[N4] Tree ground fault (ground fault due to contact of a tree with a distribution line cable): the ground fault level increases as time elapses

[N5] Foreign material contact ground fault (ground fault due to contact of a foreign material with a distribution line cable): a spike wave occurs immediately after contact, depending on a gap distance

[N6] Gap ground fault (ground fault due to arrester malfunction or the like): a spike wave continues and thus there is no temporal change in the waveform

[N7] Distribution line defect (defect such as breakage of a distribution line): there is a slave station that exhibits no response in mutual communication among slave stations Next, the configuration of the failure symptom cause estimation circuitry 83 having an artificial intelligence (AI) function, provided in the slave station 8 will be described.

The failure symptom cause estimation circuitry 83 shown in FIG. 2 includes a learning device 831 and an inference device 832.

Figure 11:
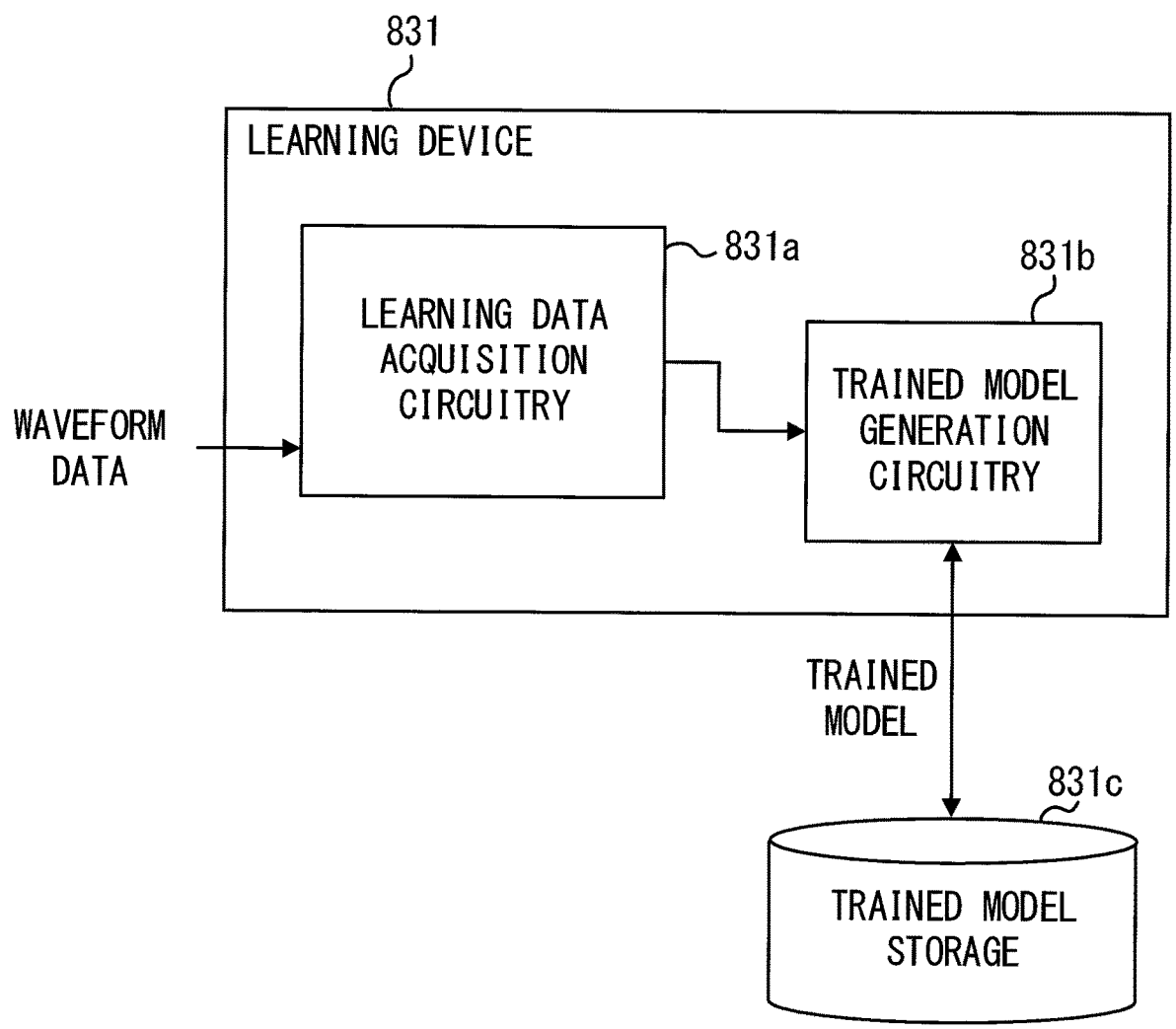
FIG. 11 is a block diagram showing the configuration of a learning device.

As shown in FIG. 11, the learning device 831 includes a learning data acquisition circuitry 831a for acquiring the waveform data taken in by the measurement circuitry 82 of the slave station 8, a trained model generation circuitry 831b which takes the waveform data acquired by the learning data acquisition circuitry 831a, as learning data, and generates a trained model for inferring a symptom cause for failure on the distribution grid 1, from the learning data, and a trained model storage 831c which stores the trained model generated by the trained model generation circuitry 831b.

In the first embodiment, basically, the trained model generation circuitry 831b generates the trained model on the basis of a learning program by unsupervised learning. Here, the unsupervised learning refers to a method in which learning data (here, waveform data of current or voltage) not including results (labels) are given to the learning device, thereby learning features present in the learning data. That is, the trained model generation circuitry 831b of the learning device 831 performs unsupervised learning by a classification method based on K-means clustering, for example. Here, the K-means clustering is an algorithm of non-hierarchical clustering and a method of classifying data into a given number K of clusters using the means of clusters.

Specifically, the K-means clustering is performed as shown in the following process. First, a cluster is randomly allocated to each data xi (i=1, . . . , N). It is noted that the number of data is N. Next, a center Vj (j=1, . . . , K) of each cluster is calculated on the basis of the allocated data. Next, the distance between each data xi and the center Vj is calculated, and each data xi is allocated again to the cluster having a center closest thereto. Then, if there is no change in cluster allocation of all the data xi in the above processing or if the change amount is smaller than a certain threshold set in advance, it is determined that convergence is reached. Then, the trained model generation circuitry 831b generates a trained model by executing learning as described above, and outputs the trained model.

Figure 12:
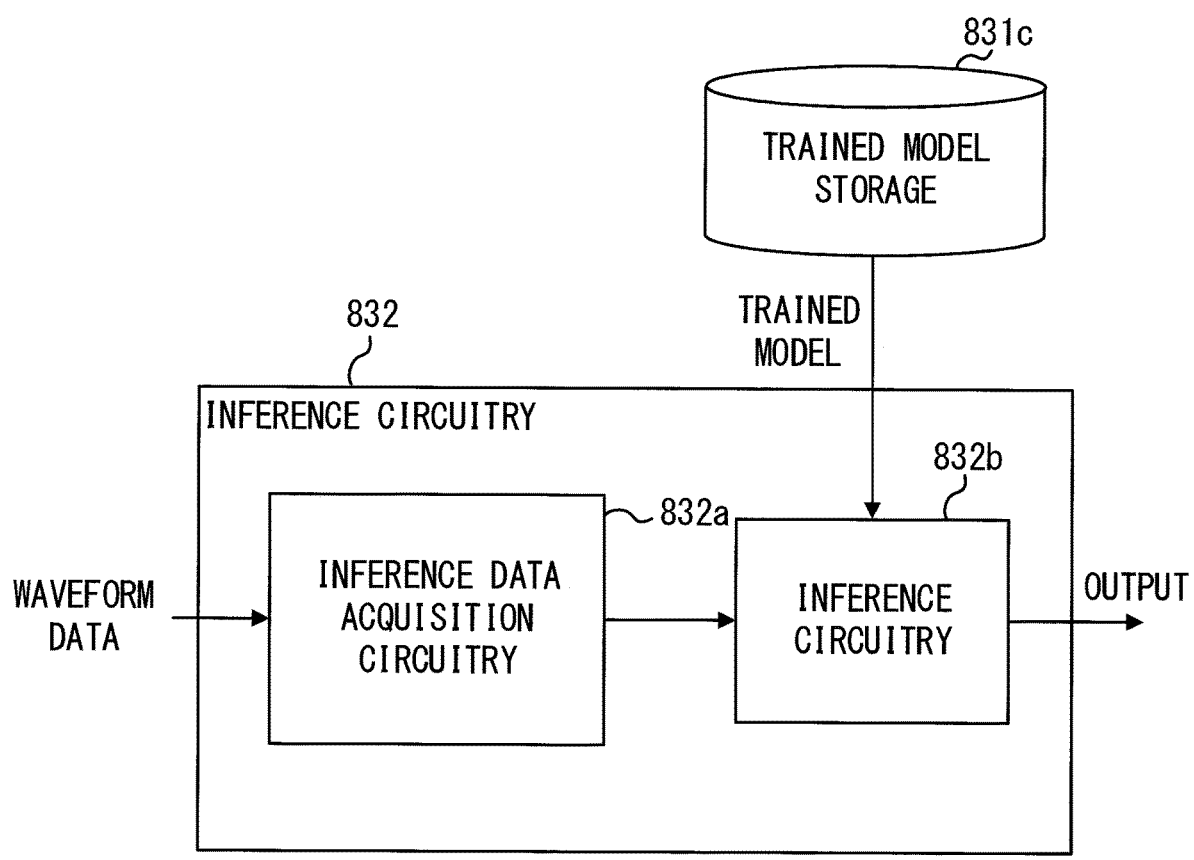
FIG. 12 is a block diagram showing the configuration of an inference device.

As shown in FIG. 12, the inference device 832 includes an inference data acquisition circuitry 832a for acquiring waveform data taken in by the measurement circuitry 82, and an inference circuitry 832b which compares the waveform data acquired by the inference data acquisition circuitry 832a, using the trained model, stored in the trained model storage 831c of the learning device 831, estimates a symptom cause leading to failure occurrence on the distribution grid 1, and outputs a result of the estimation.

Next, an example of a process in which the learning device 831 of the failure symptom cause estimation circuitry 83 generates a learning model for inferring a symptom cause leading to failure occurrence will be described with reference to flowcharts shown in FIG. 13 to FIG. 15. It is noted that reference character S denotes each processing step.

Figure 13:
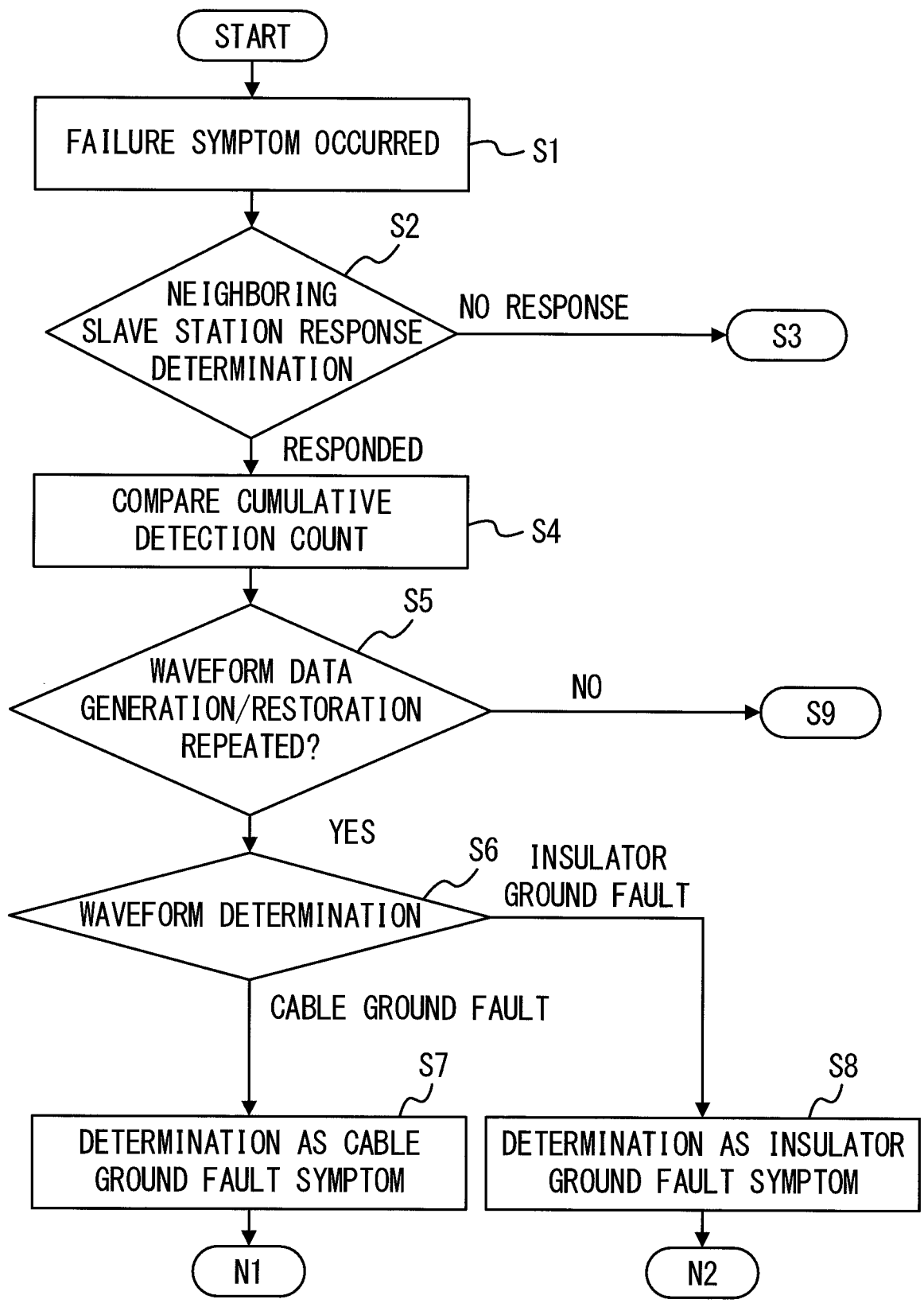
FIG. 13 is a flowchart showing an example of a process in which the learning device generates a trained model for inferring a symptom cause leading to failure occurrence.
Figure 14:
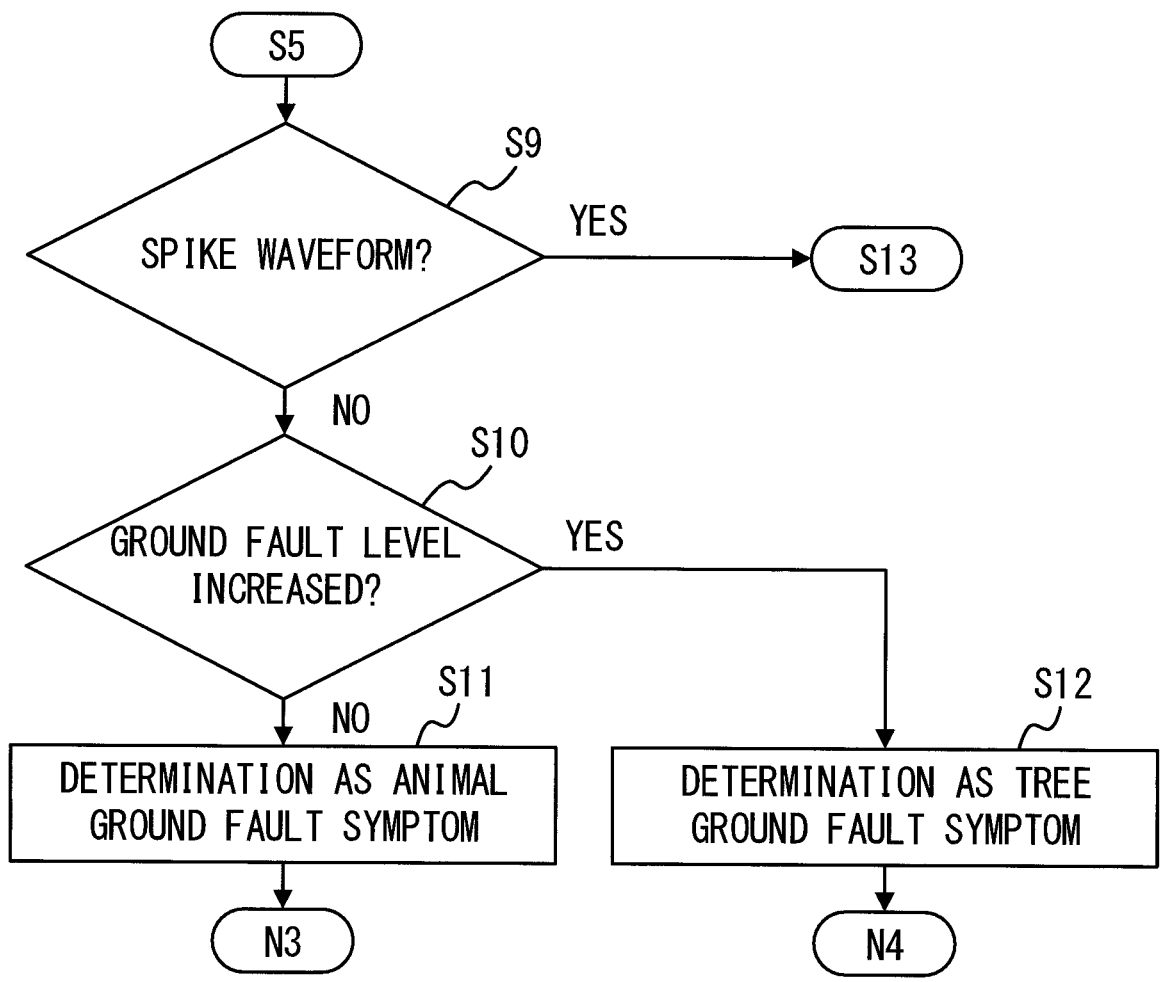
FIG. 14 is a flowchart showing an example of a process in which the learning device generates the trained model for inferring a symptom cause leading to failure occurrence.
Figure 15:
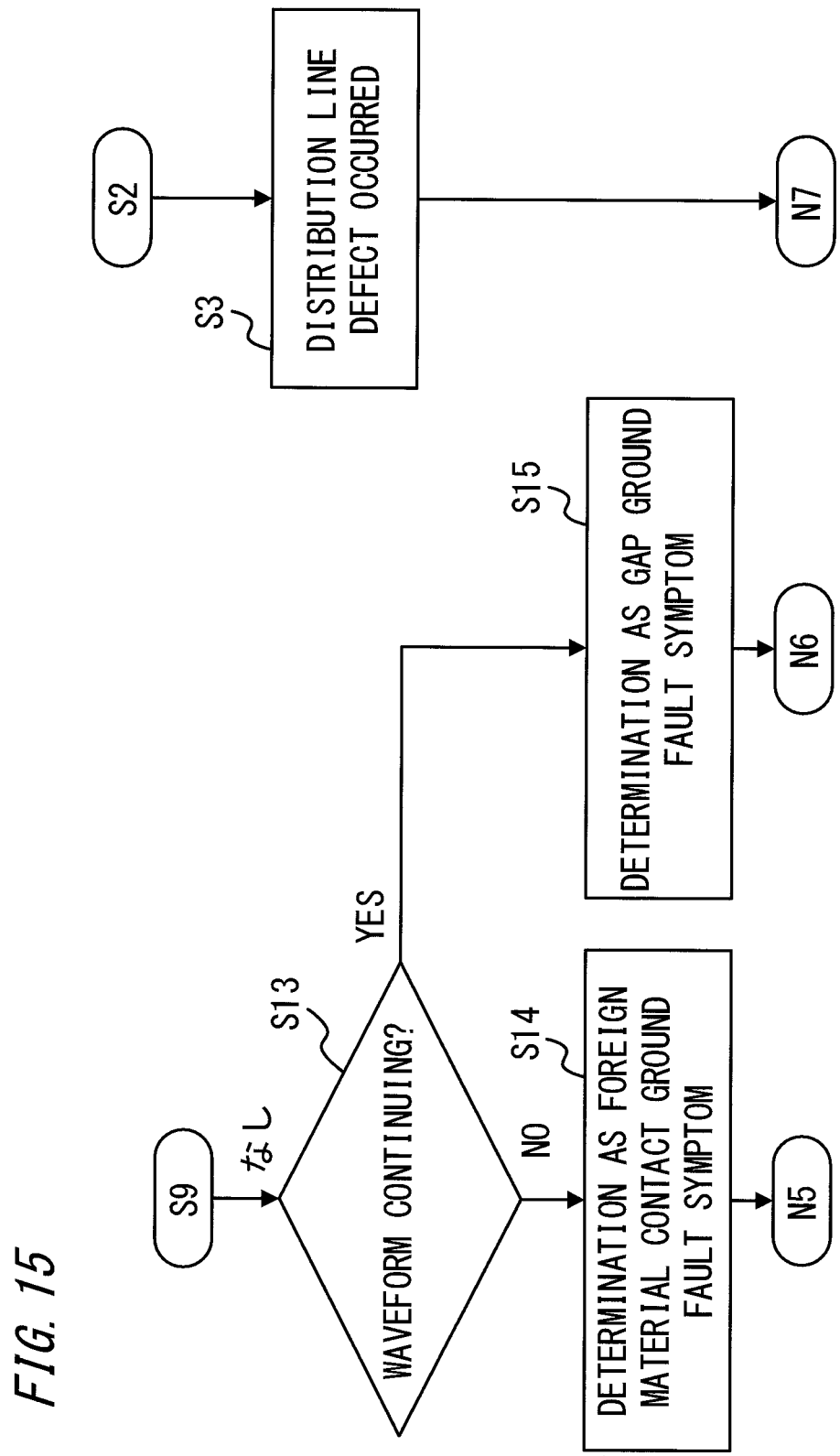
FIG. 15 is a flowchart showing an example of a process in which the learning device generates the trained model for inferring a symptom cause leading to failure occurrence.

In FIG. 13 to FIG. 15, in a case where a symptom leading to failure occurrence has occurred (step S1), the learning device 831 determines whether or not a response is mutually obtained through mutual communication with the slave stations 8 (step S2).

If there is a slave station 8 that exhibits no response when communication is mutually performed with the slave station 8, it is considered that there is a distribution line defect [N7] such as breakage of the distribution line 7 (step S3).

If a response is mutually obtained through mutual communication with the slave stations 8, each slave station 8 determines presence/absence of variation in the waveform data of current or voltage and presence/absence of variation in the cumulative detection count, measured by the measurement circuitry 82, thereby specifying a part of the distribution lines 7 where failure has occurred (step S4).

In addition, the failure symptom cause estimation circuitry 83 provided to each slave station 8 takes the waveform data of current or voltage measured in the slave station 8 into the learning data acquisition circuitry 831a of the learning device 831, and for the acquired waveform data of current or voltage, the trained model generation circuitry 831b extracts a feature (aforementioned [N1] to [N6]) of the waveform data on the basis of the learning program (steps S5, S6, S7, S8, S9, S10, S11, S12, S13, S14, S15).

Next, the feature ([N1] to [N7]) of the waveform data extracted by the trained model generation circuitry 831b is generated as a learning model (information) for symptom determination. The trained model generated by the trained model generation circuitry 831b as described above is stored into the trained model storage 831c.

In this way, in accordance with a symptom leading to failure occurrence, the learning device 831 of the failure symptom cause estimation circuitry 83 repeats the process of the flowcharts shown in FIG. 13 to FIG. 15, whereby accuracy of the trained model generated by the trained model generation circuitry 831b is gradually enhanced.

In a state in which the trained model is generated by the trained model generation circuitry 831b as described above, if a symptom leading to failure occurrence newly occurs on the distribution grid 1, the slave stations 8 communicate with each other and analyze detection data to estimate the cause. In this case, confirmation is performed not only on a slave station 8 basis but also for a higher-order system such as the circuit breaker 4, the transformer 3, and the substation 2.

That is, as in the process of the flowcharts shown in FIG. 13 to FIG. 15, the failure symptom cause estimation circuitry 83 determines whether or not a response is mutually obtained through mutual communication with the slave stations 8 (step S2).

If there is a slave station 8 that exhibits no response when communication is mutually performed with the slave station 8, it is considered that there is a distribution line defect [N7] such as breakage of the distribution line 7 (step S3).

If a response is mutually obtained through mutual communication with the slave stations 8, the inference device 832 provided to each slave station 8 acquires, by the inference data acquisition circuitry 832a, waveform data of current or voltage measured by the slave station 8.

Then, the inference circuitry 832b compares the waveform data acquired by the inference data acquisition circuitry 832a, using the trained model stored in the trained model storage 831c of the learning device 831, infers which clusters of [N1] to [N6] the waveform data belongs to, i.e., a cause of a symptom leading to failure occurrence, and outputs a result of the inference. It is noted that, if the waveform data does not belong to any of the clusters of [N1] to [N7], it is estimated that there is no failure symptom on the distribution grid 1. Then, the inference circuitry 832b transmits an output indicating the inference result [N1] to [N7], from the data transmitter/receiver 84 to the high-order server 11.

Figure 16:
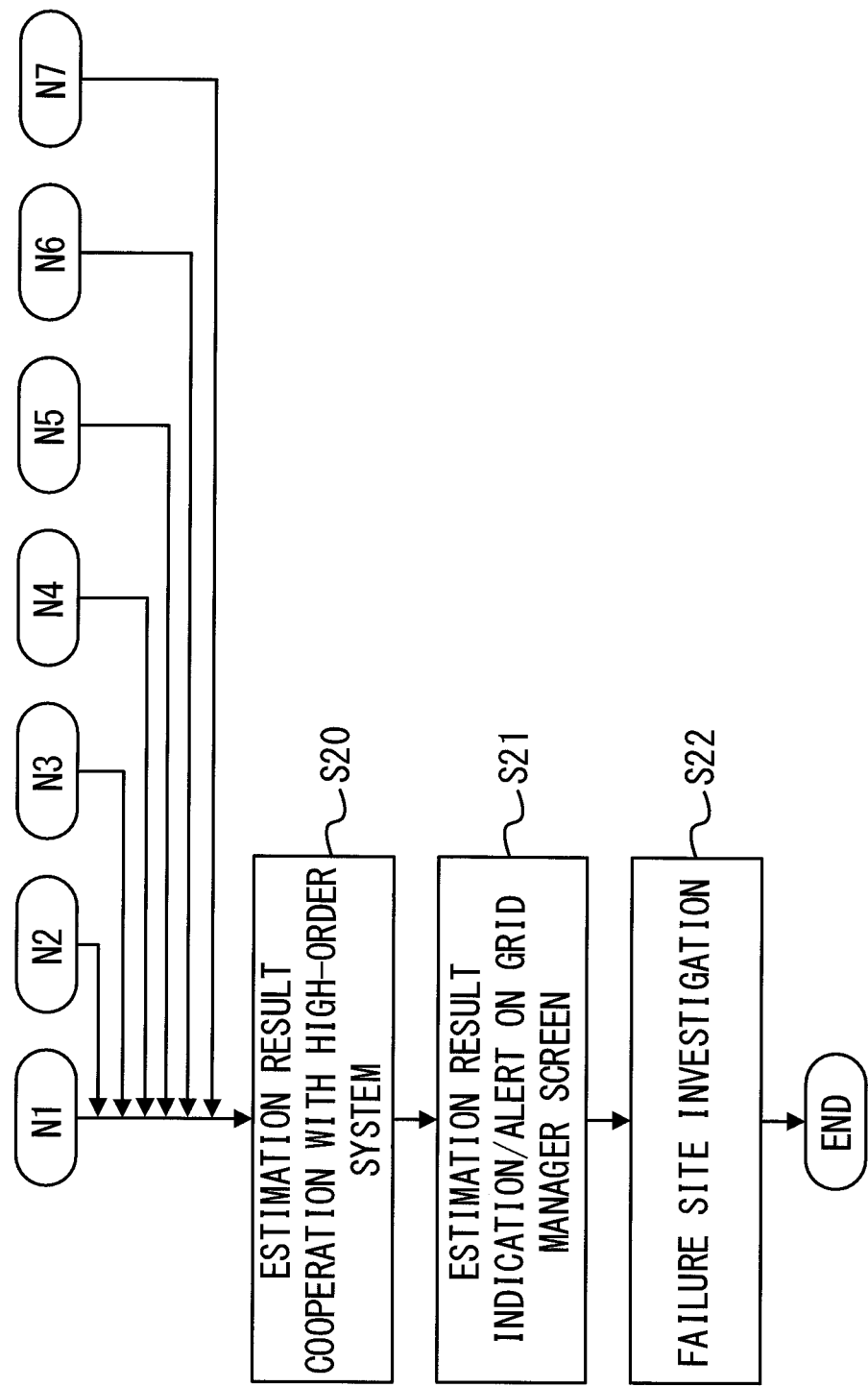
FIG. 16 is a flowchart showing operation in which a result of inference for a failure symptom occurrence cause obtained in each slave station is transmitted to the high-order server via a network and the server performs processing thereon.

As shown in a flowchart in FIG. 16, the high-order server 11 shown in FIG. 3 receives the inference result [N1] to [N7] transmitted from each slave station 8 via the IP network 10 (step S20). Then, the high-order server 11 displays the inference result on a display (not shown) that a manager for managing the distribution grid 1 has, and if there is a failure symptom, outputs an alert to an alert device (step S21). In addition, on the basis of the estimation result of the failure symptom cause, on-site investigation is conducted, i.e., the distribution lines 7 near the slave station 8 where it is assumed that the failure symptom has occurred are investigated on site, to confirm the actual situation (step S22).

The above first embodiment has shown the case where, for the distribution grid 1, an inference result is outputted using the trained model trained by the trained model generation circuitry 831*b*. However, a trained model for another distribution grid may be acquired from outside, and an inference result may be obtained using the acquired trained model.

Figure 17:
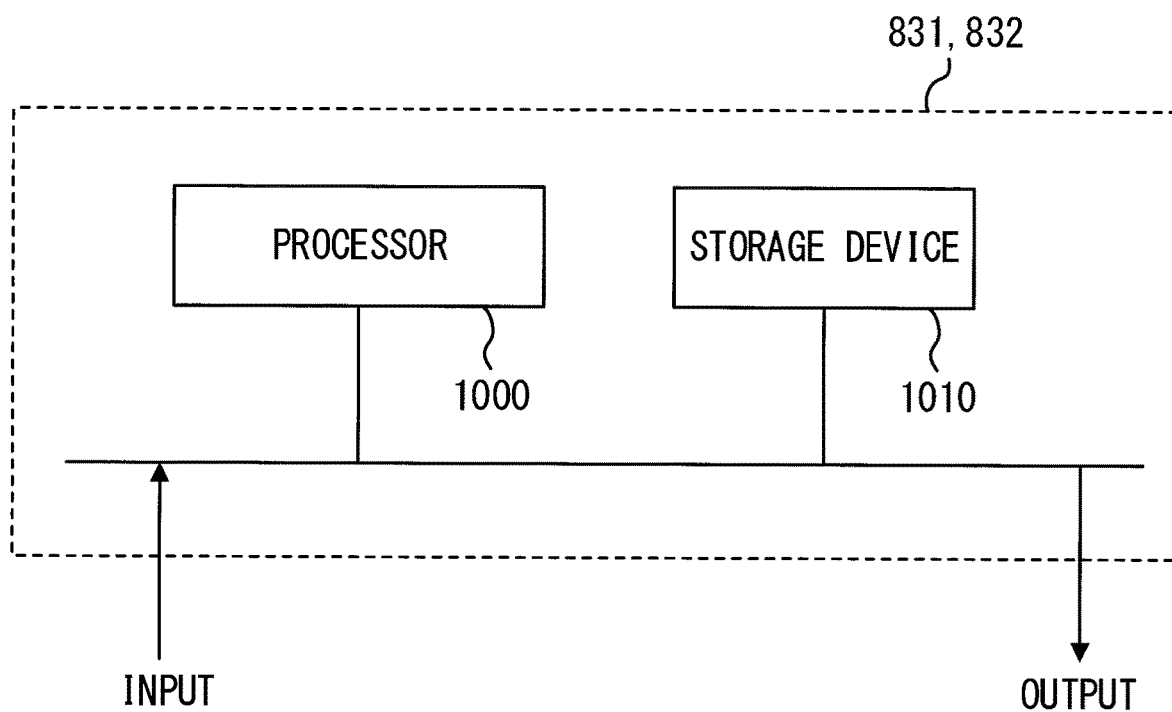
FIG. 17 is a block diagram showing an example of hardware of a failure symptom cause estimation circuitry.

The learning device 831 and the inference device 832 of the failure symptom cause estimation circuitry 83 shown in FIG. 2 are composed of a processor 1000 and a storage device 1010 as shown in FIG. 17 which shows an example of hardware. The storage device 1010 is provided with a volatile storage device such as a random access memory, and a nonvolatile auxiliary storage device such as a flash memory, which are not shown.

Instead of a flash memory, an auxiliary storage device of a hard disk may be provided. The processor 1000 executes a program inputted from the storage device 1010. In this case, the program is inputted from the auxiliary storage device to the processor 1000 via the volatile storage device. The processor 1000 may output data such as a calculation result to the volatile storage device of the storage device 1010 or may store such data into the auxiliary storage device via the volatile storage device.

As described above, in the distribution grid failure symptom cause estimation system according to the first embodiment, each slave station 8 is provided with the failure symptom cause estimation circuitry 83 having an artificial intelligence (AI) function, whereby each slave station 8 autonomously analyzes waveform data. Thus, it becomes unnecessary to transfer waveform data of a failure and a failure symptom on the distribution lines 7 to the high-order server 11 at each time. Therefore, it becomes possible to estimate a failure symptom cause without increasing the network load. In addition, since each slave station 8 autonomously operates by the failure symptom cause estimation circuitry 83 provided thereto, waveform data can be analyzed further in real time, as compared to the conventional method.

Further, since a plurality of slave stations 8 communicate with each other, learning can be performed using a combination of waveform data of the plurality of slave stations 8, whereby it is possible to estimate a cause of a failure symptom while changing an analysis range to a transformer basis, a distribution line basis, a substation basis, or the like. Thus, an occurrence location and a cause of a failure symptom are roughly specified, whereby accurate estimation for a symptom cause can be performed. This results in keeping supply reliability (shortening a power outage period), optimizing equipment investment (repair) required for measures, optimizing labor cost (inspection and restoration works), and reducing maintenance cost.

Although the disclosure is described above in terms of an exemplary embodiment, it should be understood that the various features, aspects, and functionality described in the first embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS

1 distribution grid
2 substation
3 transformer
4 circuit breaker
5 switch (normally closed)
6 switch (normally opened)
7 distribution line
8 slave station
81 operation circuitry
82 measurement circuitry
83 failure symptom cause estimation circuitry
831 learning device
831*a* learning data acquisition circuitry
831*b* trained model generation circuitry
831*c* trained model storage
832 inference device
832*a* inference data acquisition circuitry
832*b* inference circuitry
84 data transmitter/receiver
9 communication line
10 IP network
11 server
12 signal line

What is claimed is:

1. A distribution grid failure symptom cause estimation system, comprising:

plural protection distribution devices disposed on a distribution grid, each protection distribution device including plural switches is configured for detecting currents or voltages applied to distribution lines of the distribution grid, and is individually provided with plural slave stations forming a communication network, wherein the plural slave stations are connected to each other via communication lines for mutual communication and are connected to a high-order server, and wherein each slave station includes:

an operation circuitry to operate the protection distribution device in accordance with a detection result from the detector;

a measurement circuitry to perform signal processing on waveform data of the current or the voltage detected by the detector;

a failure symptom cause estimation circuitry including a learning device and an inference device having an artificial intelligence function to estimate a symptom cause for failure on the distribution grid on the basis of the waveform data measured by the measurement circuitry, and a data transmitter/receiver to transmit an estimation result of the symptom cause for failure on the distribution grid obtained by the failure symptom cause estimation circuitry, to the high-order server, wherein each slave station communicates with each other through mutual communication and autonomously analyzes the waveform data to estimate the symptom cause for failure by the failure symptom cause estimation circuitry.

2. The distribution grid failure symptom cause estimation system according to claim 1, wherein the learning device includes:

a learning data acquisition circuitry to acquire the waveform data taken in by the measurement circuitry, and a trained model generation circuitry which takes in the waveform data acquired by the learning data acquisition circuitry, as learning data, and generates a trained model for inferring the symptom cause for failure on the distribution grid, from the learning data.

3. The distribution grid failure symptom cause estimation system according to claim 2, wherein the inference device includes an inference data acquisition circuitry to acquire the waveform data taken in by the measurement.

4. The distribution grid failure symptom cause estimation system according to claim 1, wherein each slave station specifies location of failure on the distribution grid by detecting variation in the waveform data and changes in a cumulative detection count of failure symptom.

5. The distribution grid failure symptom cause estimation system according to claim 1, wherein mutual communication among the plural slave stations is a direct communication without the higher-level server.

* * * * *